United States Patent [19]

Vásquez

[11] 4,087,635
[45] May 2, 1978

[54] METHOD OF AND SYSTEM FOR CARRYING OUT CALCULATIONS BY MEANS OF A TELEPHONE SET

[76] Inventor: Tulio Vásquez, Carrera 43-A 30-91, Medellín, Colombia

[21] Appl. No.: 757,953

[22] Filed: Jan. 10, 1977

[51] Int. Cl.² ............................................ H04M 11/00
[52] U.S. Cl. .................................................. 179/2 DP
[58] Field of Search ............... 179/1 SM, 2 DP, 2 CA

[56] References Cited

U.S. PATENT DOCUMENTS 3,347,988  10/1967  Marill et al. ................... 179/2 DP

FOREIGN PATENT DOCUMENTS 1,320,895  6/1973  United Kingdom ............. 179/2 DP

*Primary Examiner*—George G. Stellar
*Attorney, Agent, or Firm*—Browdy and Neimark

[57] ABSTRACT

The invention permits to a person to make use of a computer or calculator at a distance by using a telephone to communicate with the calculator or computer. The connection may be done directly or by means of any private or public telephone system, combinations of these, and in general by any telecommunication system capable of transmitting the pulses, or tones, generated by the dialing of the telephone, and also the voice. The invention provides the facilities of communication with a computer or calculator by means of the dial of a telephone, sending the numbers and codes of operation using this dial; the verification of the numbers and codes received by the computer by means of the voice in the earphone of the telephone; the reception of the results by means of the voice and a means for the user to recognize when he can send the numbers and when the operation codes, by hearing a special tone.

7 Claims, 3 Drawing Figures

METHOD OF AND SYSTEM FOR CARRYING OUT CALCULATIONS BY MEANS OF A TELEPHONE SET

FIELD OF THE INVENTION

This invention related to the utilization of a computer or calculator from a common telephone, used as a remote terminal IN-OUT of said computer without the necessity of performing any special modification to said telephone or to the telephonic lines associated with it. The invention makes use of the dial of the telephone as the IN PUT means to the computer and of the earphone of the telephone as the OUT PUT means from the computer. In a general sense, the invention relates to the IN-OUT systems or a computer and to the data and voice transmission. The telephone line has already been employed for data transmission, but the dial of the telephone has not been employed for this purpose directly. The already used system uses the so called "MODEMS" (Modulator-Demodulator) and sends the data in binary system. One way of doing that is assigning an audio frequency for the binary digit "ZERO" and another for the binary digit "ONE". It will then be employed an equipment which makes the codification (modulator) which introduces the data to the telephone line, and at the other end it will be used a demodulator which makes the inverse process. As it can be seen, it is necessary to have a special equipment (MODEM) which in reality sends and receives the data, while the telephone rests passive.

Sometimes, the remote terminals of a computer are smaller computers or calculators, but in any case, the sending of numbers and codes of operation is made by means different from the dialing of the telephone. There are also terminals with a television screen for the visual reception of the data and with a keyboard for sending said data.

SUMMARY OF THE INVENTION

In a private or public telephonic central there is a computer which is conected to a codifier-decodifier system. A telephone located at the terminal of the line of the telephonic plant will be able to enter in communication with the computer when a predetermined telephone number is dialed. The operator of the telephone—which may be of the pulse of the tone types—will receive, when he has dialed said telephone number, a signal which will indicate to him that he is communicated with the computer. As an example : the operator wishes to solve with the computer the operation 16 ÷ 2.5; this example will be restricted to the pulse type of sending signals, a conventional dialing system. Once the operator has heard the signal of interconnection, he will proceed to dial the digit 1, which will be received by the decodifier as digit 1, since a small interval between the dialing of one digit and the following will be present; immediately, the operator will receive as response from the computer the voice "one". The operator will then proceed to dial the digit 6, which will be introduced to the computer, and the annexed equipment will produce immediately as response the voice "six". Since the operator has finished the sending of the first number which will be processed by the computer, he will wait some time—as an example—1.5 seconds, and this pause will be interpreted by one of the annexed electronic equipments as the end of the input of the first number. When the computer and its annexed circuits detect the time of 1.5 seconds, they send a tone signal which makes the operator verify that the number has been terminated. Then, the operator will dial the digit corresponding to the code of operation, in this case division, which as an example will be the digit 3; after having dialed 3, the operator will wait 1.5 seconds and he will receive as response the voice "divided"; immediately, he will hear a tone which will indicate him that he can begin to introduce the number of the divisor, in this case the first digit will be 2. After having dialed this first digit of the divisor, the operator will hear the voice "two" and he will wait again 1.5 seconds, until he hears the tone which indicates him that he can proceed to dial the code corresponding to the decimal point, which— as an example—will be the digit 1. The operator will receive in response the voice "point" and he will wait until he receives the tone which will be the signal that he can dial the following digit, which in this example is a 5, receiving as response the voice "five" which corresponds to the first decimal digit of the divisor. Having introduced totally the divisor, the operator will wait 1.5 seconds until he hears the tone to introduce the corresponding code for another operation, which in this example is the result and which corresponds—as an example— to the digit 4. After having introduced this code, the operator will hear the voice "result" and then a tone which indicates that the computer will begin to send the result of the operation through its annexed equipment. In this example, the operator will hear the voice "six point four".

DESCRIPTION OF THE PREFERRED EMBODIMENT

Figure 1:
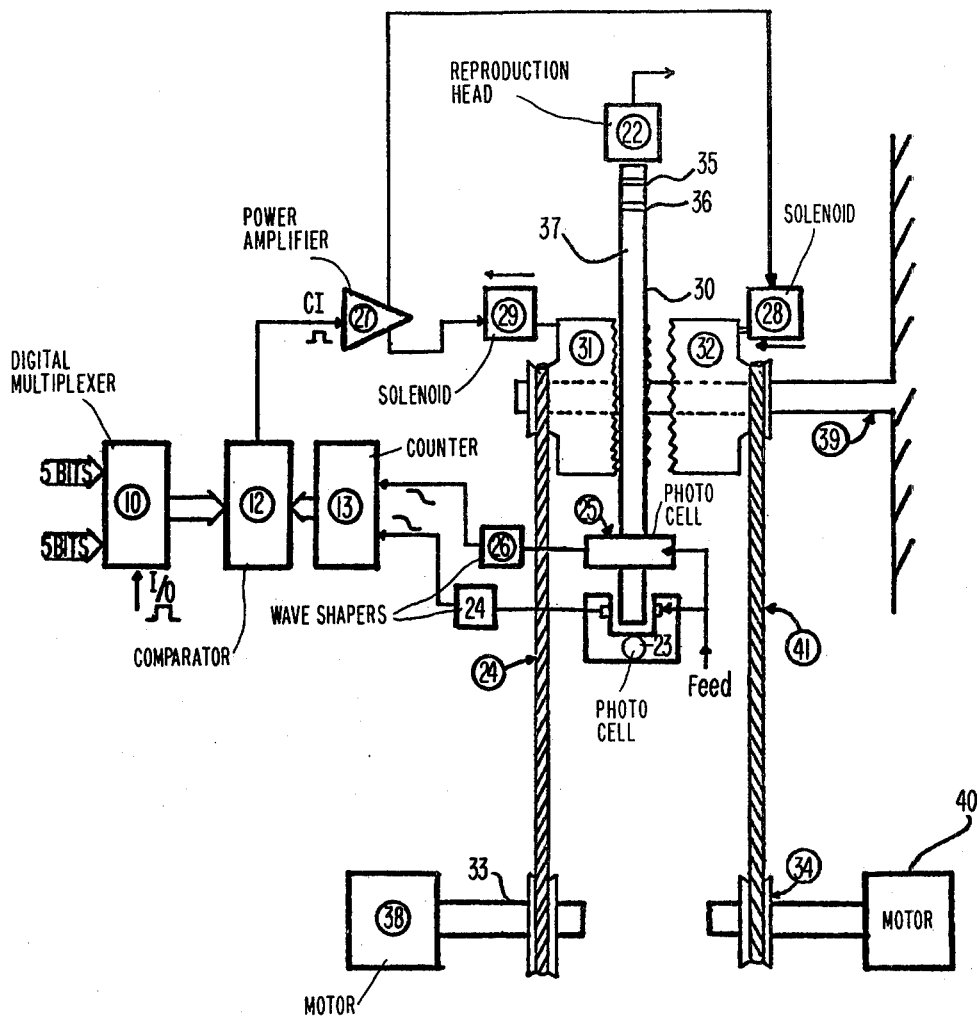
FIG. 1 is a front, partially sectional view of the mechanical, and some electrical and electronic components of a preferred embodiment of a system in accordance with the present invention.
Figure 2:
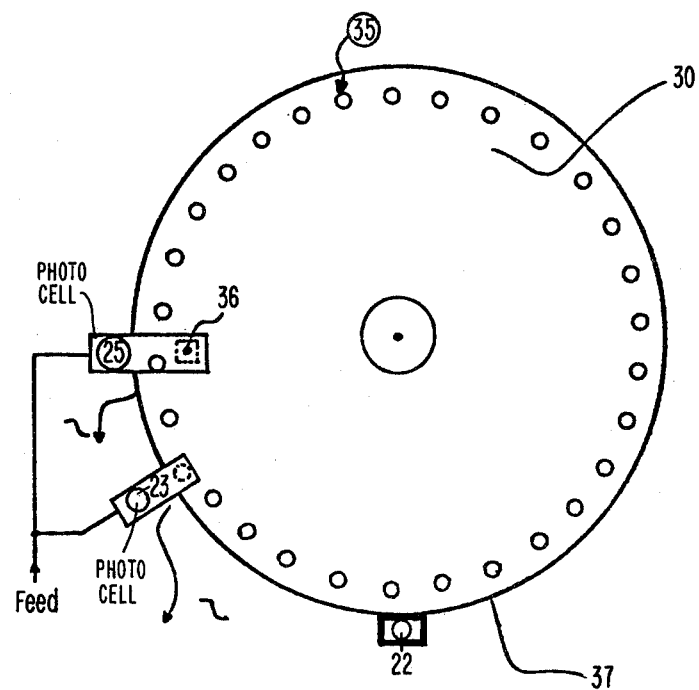
FIG. 2 is a side view of the fundamental disk of the mechanical part, with some electrical components of the system of FIG. 1.
Figure 3:
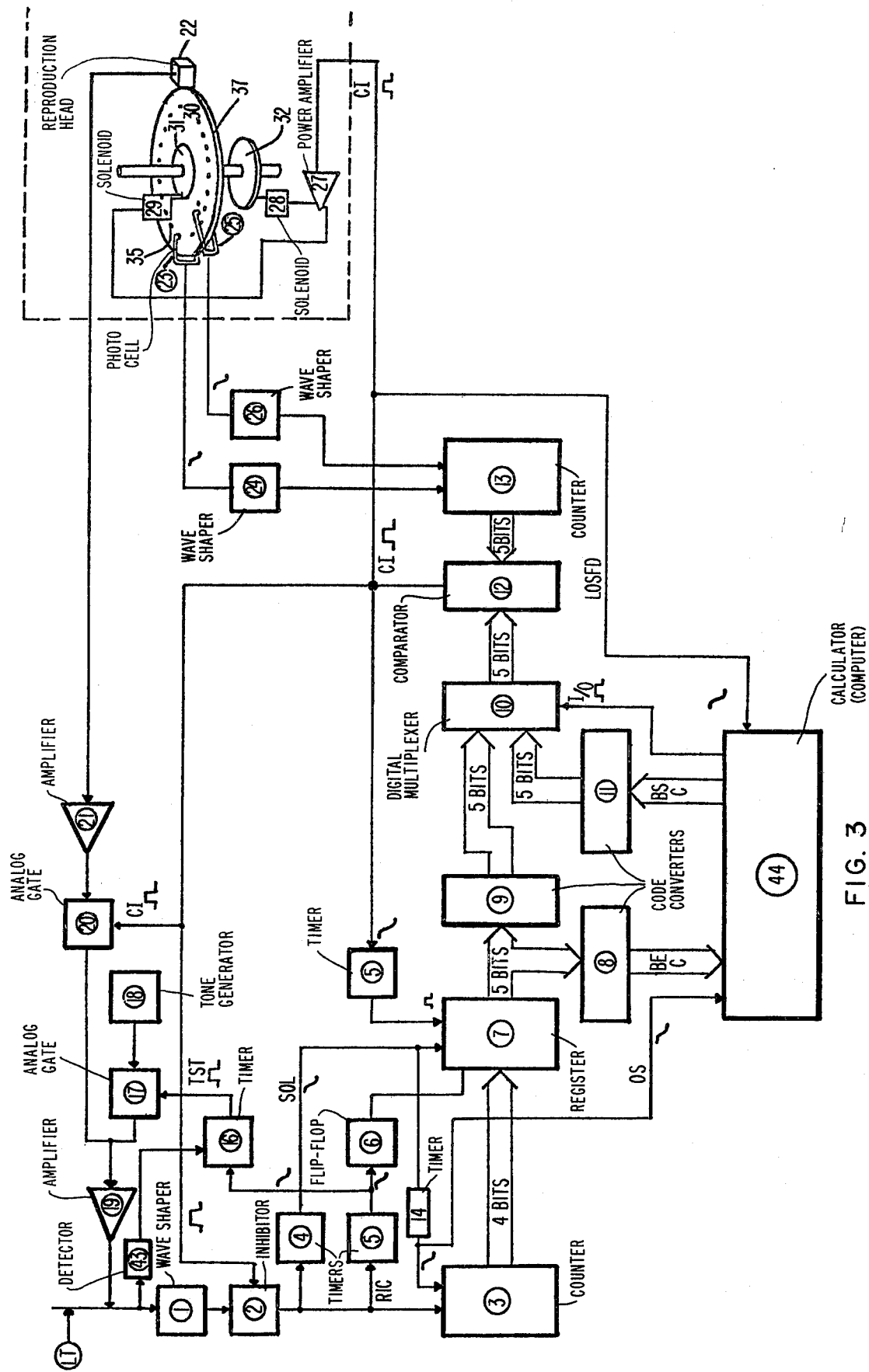
FIG. 3 is a block diagram of a system in accordance with the present invention the electronic circuits their interconnections and their connection with the electrical and mechanical parts the mechanical portion being shown somewhat diagramatically in a pictorial perspective view.

Referring to FIGS. 1—3, when the operator has dialed the telephone number corresponding to the terminal of the computer or calculator, he obtains a tone signal which comes from the tone generator 18 through the analog gate 17 and the amplifier 19. The analog gate 17 is actuated by the temporizer 16 which is itself actuated by the communication detector 43 which gives power to the system and triggers the timer 16 when the communication has been established. When the operator hears the tone, he receives the confirmation that the communication has been established. The operator will proceed than to send the first number which will be processed by the computer.

The disk 30 is a disk of about 20 cm. of diameter-as an example-which periphery has a magnetic tape 37 with the recorded voices of the digits from 1 to 0, and the operational codes, such as : sum, substraction, multiplication, division, and in general, as many operands as it is desired. The disk has at a given radius from its center a first circumferentially spaced plurality of holes 35 which correspond to each section of voice recorded. It also has at a different radial distance from its center a single hole 36 which serves as a reference to indicate the beginning of the disk, as an example the section which has recorded the voice "one". The plurality of holes 35 are read by the optic photo-cell 23 and the hole corresponding to the second circumference of synchronization is read by the optic photo-cell 25. The disk 30 is governed by the clutches 31 and 32, the first of which is normally thrown in, permiting that by the pulley which it posses and which is coupled by mean of the band 24 to a motor 38 which impresses to the pulley 33 and therefore to the disk 30 an exploration velocity, as an example 500 rpm. The second clutch 32 is normally thrown out. When the decodifier system of the computer, which is realized by the various blocks in FIG. 3, receives a digit, the comparator 12 compares the output of the counter 13, (which receives signals from the optic photo-cell of synchronization 25 in combination with the optic counter photo-cell 23), with the signal which comes from the digital multiplexer 10 receives information from the code converters 9 or 11 (FIG. 3) whichever the case may be, by a process which is to be described hereinabove When the codes from 10 and 13 are equal, the comparator 12 produces a signal indicating that the solenoid 29 of the clutch 31 and the solenoid 28 of the clutch 32 must be energized; the clutch 32, which is coupled to the motor 40 by means of a band 41 and the pulley 34 makes the transition from the exploration velocity to the lower reproduction velocity, as an example 10 rpm. This change of velocity will be virtually immediate, and being commanded by the comparator 12, it is made in perfect synchronization with the section of the tape which has recorded the voice corresponding to the binary code coming from 10, which may be related to a decimal digit or to an operational code; the recording will be reproduced by the magnetic reproduction head 22. The clutchs 31 and 32 are free to rotate on a fixed axis 39 and they can be displaced on said axis 39 commanded axially by the solenoids 29 and 28 respectively. The solenoids 29 and 28 are driven by the power amplifier 27, which receives its input signal from the comparator 12. The solenoid 29 acts by atraction and the solenoid 28 acts pushing the clutch 32.

After having sent the voice corresponding to the code existing at the output of the multiplexer 10 to the operator, the photo-cell 23 will detect a hole 35 of the disk 30, it will produce the electric signal which is conformed by the wave shaper 24 and will thus make advance the counter 13 by one, causing to disappear the identity between its code and the code of the multiplexer 10. When this identity of codes disappears, the comparator 12 produces the corresponding order to block the passing of the voice signal through the analog gate 20 (FIG. 3) and to make the disk 30 return to the exploration velocity removing the energy input to the solenoids 28 and 29. The same signal from the comparator 12 triggers the timer 15, which in turn clears the register 7 thus avoiding that a code identity can formed between the output of the counter 13 until a new code is fed into the register 7.

To send any number to the computer, the operator will proceed sending it digit by digit, following the order from the digit of more weight to the digit of less weight.

The signals sent by the operator making use of the dial pass through the wave shaper 1, then by the counter inhibitor 2, and they arrive to the counter 3, which converts the received signal to the binary system. The corresponding bits are stored in the storage register 7. After having been stored in the register 7, these bits are driven by the code converters 8 and 9 to the digital computer or calculator 44 and to the digital multiplexer 10, respectively. From the multiplexer 10, they pass to the comparator 12, to be compared with the bits which come from the counter 13 which continuously retains the information about which section of the disk 30 is situated in front of the magnetic reproduction head 22.

When the comparator 12 establishes an identity between the bits coming from the multiplexer 10 and the bits coming from the counter 13, a signal is immediately produced, which gives energy to the solenoids 28 and 29, making thus the disk 30 to pass from the exploration velocity to the reproduction velocity in the section which has recorded the voice corresponding to the digit, simbol or operator to be reproduced and which binary code is at the output of the multiplexer 10. The reproduction is made by means of the magnetic head 22, which applies the signal to the amplifier 21 which applies the signal to the output amplifier 19 (this is possible because the output of the comparator 12 allows the analog gate 20 to pass the signal to the output amplifier 19); the amplifier 19 carries the signal the the telephone line and this signal is thus heard by the operator in the earphone of the telephone.

Once the reproduction of the corresponding section has been finished, the photo-cell 23 will detect a hole 35 of the disk 30 and, through the wave shaper 24, will make the counter 13 advance by one, disappearing thus the identity of codes between the output of the counter 13 and the output of the multiplexer 10; the comparator 12 will then give the order of changing to the exploration velocity to the reproduction system and will block the analog gate 20. While the comparator 12 finds an identity of codes between the outputs of the counter 13 and the multiplexer 10, it makes the inhibitor 2 to block the possibility of passing of the signal to the counter 3, to prevent false counting produced by the reproducing of the voice which comes from the amplifier 19.

To distinguish the pulses of a digit from the pulses of another digit, it is made use of the interdigital pause between the dialing of two consecutive digits. This interdigital pause is recognized by the timer 4, which will give the storage order to the register 7 only after finished a pulse produced by the dial of the telephone, there appears a longer pause than that which exist between consecutive pulses produced by the dial when a digit is dialed. The timer 4 triggers the timer 14 at the same time that it gives the storage order to the register 7, by mean of the storage order line, SOL. When the timer 14 finishes its timing function, it gives to the computer 44 the order of storing the binary code which is at the output of the code converter 8 (this order is given through the line "order of storage," OS). The code at the output of the code converter 8 is produced by the output of the register 7, which itself corresponds to the digit dialed in the telephone. The same timer 14 by mean of the line "Reset of the Input Counter", RIC, clears the counter 3, leaving it in condition to receive the next digit.

To distinguish the dialing corresponding to a number from the dialing corresponding to an operational code, use is made of the tone generated by the tone generator 18, to give to the operator information about such change of state. The tone passes through the analog gate 17, triggered by the timer 16, which itself is triggered by the timer 5. When the time between the end of a dialing pulse and the beginning of another is still longer than the interdigital pause between the dialing of two digits, for example 1.5 seconds, the timer 5 triggers the timer 16, permiting thus the tone generated by 18 to go out to the telephone line. This tone is recognized by the operator as a change from the sending of numbers to the sending of operational codes or inversely. At the same time that the operator receives the tone and by action of the timer 5, the flip-flop 6 will make a transition of its output from a logic zero to a logic one or inversely. The output of the flip-flop 6 is stored in the register 7 with the bits coming from the counter 3. Thus, it is possible that a digit dialed by the operator may have two meanings to the computer; depending on the sequence followed, the computer will take one combination as a digit and another combination as an operational code.

When the operator sends the code "TOTAL" this is recognized by the computer, which, by mean of the line I/o will give to the multiplexer 10 the order of blocking the codes coming from the code converter 9 and of permiting the passing of the codes coming from the code converter 11, which depend on the output of the computer. Thus, when the computer has finished the corresponding operations to the orders received, it will begin to take out, through the code converter 11 and the multiplexer 10, the result to the comparator 12, in order that this comparator give the order of reproduction of the corresponding voices, when it excites the amplifier 27 and produces thus the change from the exploration to the reproduction velocity and inversely, as it has been already explained. The computer will send first the digit of greater weight, and when the identity between the code of the multiplexer 10 and the code of the counter 13 disappears by action of the photo-cell 23 through the wave shaper 24, the computer will receive the order of sending the following digit of greater weight. This order is received by the computer coming from the output of the comparator 12 through the "line of order of sending the following digit" LOSFD. Thus is sent to the operator the response of the computer by mean of the voice coming from the magnetic tape 37, through the magnetic head 22, the amplifier 21, the gate 20, the amplifier 19, the telephone line, and, finally, the earphone of the telephone.

It will be obvious to those skilled in the art that various changes may be made without departing from the scope of the invention and the invention is not to be considered limited to what is shown in the drawings and described in the specification.

What is claimed is:

1. A method of calculation comprising the steps of:
   communicating with a calculator or computer via a telephonic link by dialing a predetermined telephone number from a telephone;
   entering numbers and operational codes sent from the telephone via the telephonic link into the calculator or computer, and verifying said numbers and codes by means which reproduce corresponding voice representations of the numbers and codes in the earphone of the telephone;
   interpreting different pauses between said numbers and said codes by control means which cause the calculator or computer to interpret them adequately for a calculation, which it is to perform; and
   comparing calculating results digit by digit, including operational codes, with sequences produced by a voice signal reproduction means which produces a voice signal representation of said calculation results which is applied via an amplifier to the telephonic link and reproduced at the earphone of the telephone.

2. A system for carrying out calculations, the system comprising:
   an electronic calculator or computer situated at one end of a telephonic link;
   a telephone located at another end of said telephonic link and which, by its dialing signals introduces into said calculator numbers and codes for a selected calculation and reproduces in its earphone in voice form data sent to said calculator and processed results from said calculator sent back via said telephone link;
   first control means operatively associated with said calculator for decodifying dialing signals coming from said telephone via said link, said first control means including means for evaluating pauses between these signals and convert then into input information to said calculator in form of numbers and codes;
   a comparison device coupled to said first control means, responsive to its information output and operatively associated with a voice reproduction means for causing voice signals representative of each received digit and each received code, according to the established pauses, to be reproduced in the earphone of the telephone from said reproduction means via said link; and
   further control means operatively assciated with said calculator for codifying its calculation results and for entering them into a comparison means, which when it establishes identity between the codified calculation results and an accumulation of signals coming from a voice reproduction device under control of synchronism signals received therefrom, produces a signal which modifies the velocity of said voice reproduction device and effects a feed of a voice signal representation of the calculation results to said earphone of said telephone via said link.

3. A system according to claim 2, including means for converting the dialing signals into a new code compatible with that required by said calculator.

4. A system according to claim 2, including means for codifying signal results obtained from said calculator into a form compatible with signals produced by said voice reproduction means.

5. A system according to claim 2, including voice reproduction control means in which the produced voices correspond to digits and codes coming from said telephone and said calculator comprise movable means having an exploration velocity and a reproduction velocity, said movable means having at least one synchronization element which permits selection of voice signals by comparison between an accumulation of pulses coming from said at least one synchronization element and signals from said telephone and said calculator.

6. A system according to claim 5, including means for sensing an identity between a signal coming from said calculator and a signal coming from said voice reproduction means for producing a signal which makes said voice reproduction means reproduce a voice signal corresponding to the code or number as the case may be which the signal from the calculator represents in the earphone of the telephone.

7. A system according to claim 2, wherein said comparison device comprises means for permitting decodified signals coming from said telephone to be verified when they are compared with the signals coming from said voice reproduction means to establish that there is identity between them, said voice reproduction means, under control of said means for permitting reproducing voice signals corresponding to the respective numbers and codes received via said link from said telephone.

* * * * *